US011539965B2

(12) United States Patent
Peng et al.

(10) Patent No.: US 11,539,965 B2
(45) Date of Patent: *Dec. 27, 2022

(54) SCANNING ORDERS FOR NON-TRANSFORM CODING

(71) Applicant: Microsoft Technology Licensing, LLC, Redmond, WA (US)

(72) Inventors: Xiulian Peng, Beijing (CN); Jizheng Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,460

(22) Filed: Mar. 8, 2021

(65) Prior Publication Data

US 2021/0195216 A1 Jun. 24, 2021

Related U.S. Application Data

(63) Continuation of application No. 16/735,546, filed on Jan. 6, 2020, now Pat. No. 10,979,724, which is a
(Continued)

(51) Int. Cl.
| *H04N 19/176* | (2014.01) |
| *H04N 19/159* | (2014.01) |
| *H04N 19/129* | (2014.01) |
| *H04N 19/107* | (2014.01) |
| *H04N 19/124* | (2014.01) |
| *H04N 19/61* | (2014.01) |
| *H04N 19/70* | (2014.01) |
| *H04N 19/91* | (2014.01) |

(52) U.S. Cl.
CPC ......... *H04N 19/176* (2014.11); *H04N 19/107* (2014.11); *H04N 19/124* (2014.11); *H04N 19/129* (2014.11); *H04N 19/159* (2014.11); *H04N 19/61* (2014.11); *H04N 19/70* (2014.11); *H04N 19/91* (2014.11)

(58) Field of Classification Search
None
See application file for complete search history.

(56) References Cited

U.S. PATENT DOCUMENTS

| 10,171,818 B2* | 1/2019 | Peng | H04N 19/176 |
| 10,560,704 B2* | 2/2020 | Peng | H04N 19/176 |
| 10,979,724 B2* | 4/2021 | Peng | H04N 19/176 |

OTHER PUBLICATIONS

"Office Action Issued in Japanese Patent Application No. 2018-080355", dated Apr. 21, 2021, 54 Pages.
(Continued)

*Primary Examiner* — Christopher G Findley
(74) *Attorney, Agent, or Firm* — Klarquist Sparkman, LLP

(57) ABSTRACT

Non-transform blocks of video content may be coded by selectively changing a scanning order. In some implementations, an encoder or decoder may perform a scanning process on a block according to a scanning order. When the block has not been transformed, the encoder or decoder may selectively change the scanning order to a different order. For example, if the block is associated with a particular type of prediction, the scanning order may be changed to a different order. In another example, if the non-transform block has a size that is smaller than a predetermined size, the scanning order may be changed to a different order.

20 Claims, 5 Drawing Sheets

Related U.S. Application Data continuation of application No. 16/210,839, filed on Dec. 5, 2018, now Pat. No. 10,560,704, which is a continuation of application No. 14/906,513, filed as application No. PCT/CN2013/079964 on Jul. 24, 2013, now Pat. No. 10,171,818.

(56) References Cited

OTHER PUBLICATIONS

Bross, et al., "High Efficiency Video Coding (HEVC) text specification draft 7", in 9th Meeting of Joint Collaborative Team on Video Coding (JCT-VC) of ITU-T SG16 WP3 and ISO/IEC JTC1/SC29/WG11, Document-JCTVC-I1003_d0, Apr. 27, 2012, 4 Pages.

"Office Action Issued in Mexican Application No. MX/a/2016/001016", dated Mar. 5, 2018, 9 Pages.

"Office Action Issued in New Zealand Patent Application No. 715990", dated Aug. 16, 2019, 1 Page.

\* cited by examiner

SCANNING ORDERS FOR NON-TRANSFORM CODING

RELATED APPLICATIONS

This application is a continuation application of U.S. patent application Ser. No. 16/735,546, filed Jan. 6, 2020, which is a continuation application of U.S. patent application Ser. No. 16/210,839, filed Dec. 5, 2018, which is a continuation application of U.S. patent application Ser. No. 14/906,513, filed on Jan. 20, 2016, which is a 371 National Stage Application of International Application No. PCT/CN2013/079964, filed Jul. 24, 2013, and published as WO 2015/010268 on Jan. 29, 2015, the entire contents of which are incorporated herein by reference.

BACKGROUND

Video compression techniques are utilized to efficiently delivery and store video content. These techniques generally seek to reduce the amount of data that represents the video content. In one example, a video frame is divided into blocks of pixels (e.g., coding units) that are subjected to various coding techniques, such as prediction, transform, quantization, and entropy coding. During coding of a block of pixels, a scanning process may be performed on a two-dimensional array of data associated with the block (e.g., transform coefficients) to rearrange the data into a one-dimensional array that is subjected to entropy coding. The scanning process may be performed according to a particular order (e.g., horizontal, zig-zag, vertical, etc.) to arrange particular data (e.g., non-zero coefficients) at one end of the one-dimensional array.

SUMMARY

This disclosure is directed to coding non-transform blocks of video content according to an optimum scanning order. In some implementations, an encoder or decoder may perform a scanning process during coding to change a two-dimensional array of data associated with a block of pixels into a one-dimensional array of data, or vice-versa. The scanning process may be performed according to an order (e.g., horizontal, vertical, zig-zag, etc.) to rearrange the data for entropy coding. When a coding block that has been transformed is to be coded, the encoder or decoder may utilize a particular scanning order. When a block that has not been transformed is to be coded (e.g., a non-transform block, a block associated with non-transform coding, etc.), the encoder or decoder may selectively change the particular scanning order to a different order. For example, if the non-transform block is associated with a particular type of prediction, the scanning order may be changed to a different order. In another example, if the non-transform block has a size that is smaller than a predetermined size (e.g., an 8×8 block, a 16×16 block, etc.), the scanning order may be changed to a different order.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
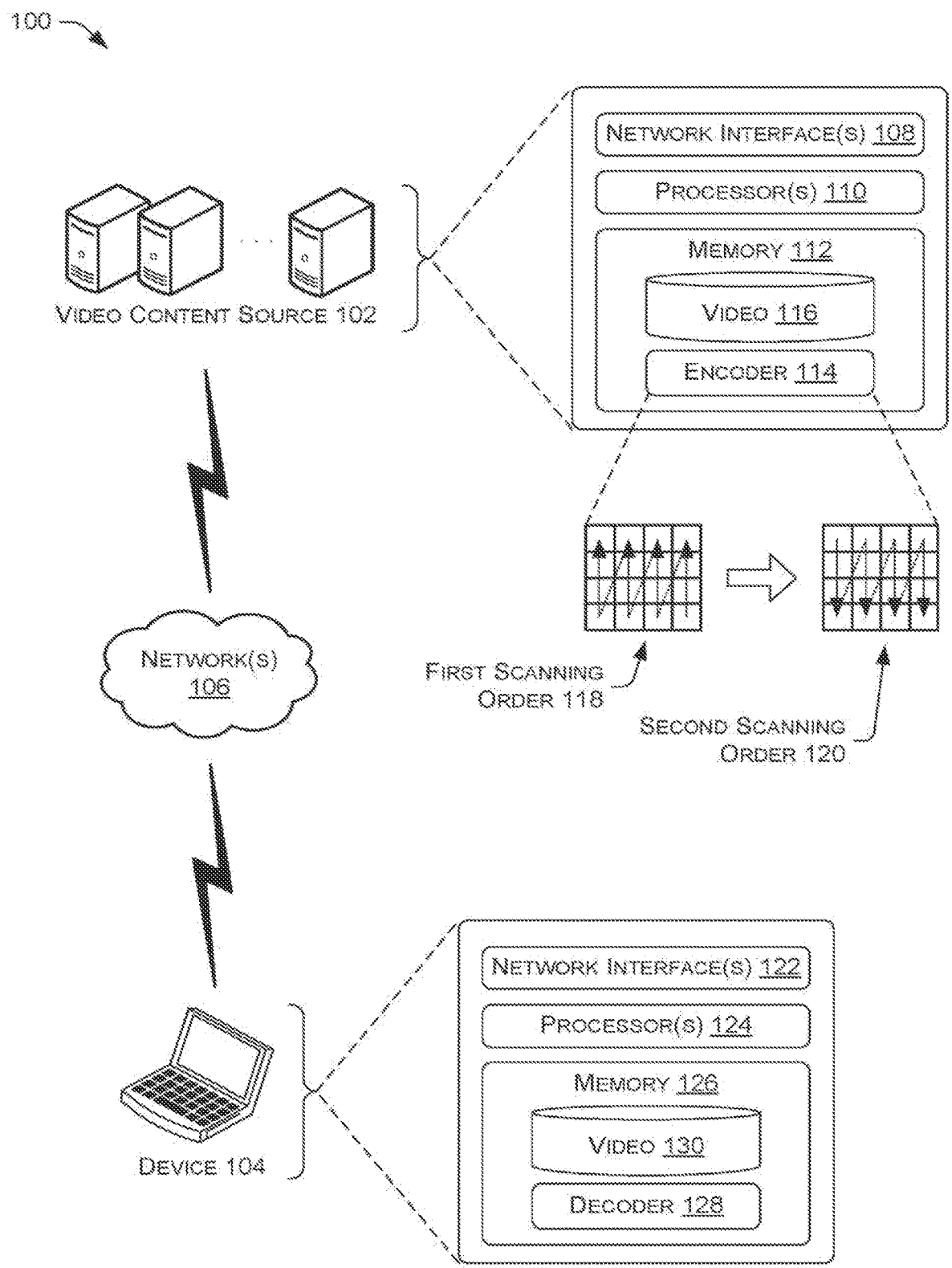
FIG. 1 illustrates an example architecture to code non-transform blocks of video content by selectively changing a scanning order.

Video content generally includes a series of frames with duplicative information in a single frame or across multiple frames. In order to reduce an amount of duplicative information, various coding (e.g., compression) techniques may be implemented to decrease a number of bits used to represent the video content, such as prediction, transform, quantization, and entropy coding. While performing the coding techniques (e.g., before or during entropy coding), a scanning process may be performed to change a two-dimensional array of data associated with a block of pixels into a one-dimensional array of data, or vice-versa. The scanning process may be performed according to a particular order (e.g., horizontal, vertical, zig-zag, etc.) in an attempt to arrange particular types of data (e.g., non-zero transform coefficients) at one end of the one-dimensional array. However, a uniform scanning order for all types of blocks may lead to undesired results, such as the sporadic distribution of particular types of data in the one-dimensional array.

This disclosure is directed to coding non-transform blocks of video content according to an optimum scanning order. In some instances, a scanning order that may otherwise be used to scan a non-transform block may be selectively changed to a different order based on information associated with the non-transform block (e.g., a prediction mode and/or size of the block). This may allow particular types of data associated with the block to be efficiently arranged during scanning and/or to avoid unnecessarily introducing complexity due to changing scanning order.

In some implementations, an encoder or decoder may code a block through prediction, quantization, and/or entropy coding without transforming the block. This type of block may be referred to as a "non-transform block." In such instances, the encoder or decoder may determine whether or not to change a scanning order of a scanning process that is performed during coding. For example, the encoder or decoder may determine whether to scan the non-transform block according to a scanning order that is used for blocks that have been transformed (referred to as "transformed blocks") or whether to scan the non-transform block according to a different order.

To illustrate, if the non-transform block is associated with a particular type of prediction (e.g., intra-prediction), the non-transform block may be scanned according to a different order than that used for scanning transformed blocks. In another example, if the non-transform block has a size that is smaller than a predetermined size (e.g., an 8×8 block, a 16×16 block, etc.), the non-transform block may be scanned according to a different order than that used for scanning transformed blocks.

In either case, the non-transform block may be scanned according to an optimum scanning order. For instance, a two-dimensional array of data of the non-transform block (e.g., residual information) may be scanned in a particular order to generate a one-dimensional array of data. The one-dimensional array may then be subjected to entropy coding.

While many of the coding techniques are described herein in the context of the High Efficiency Video Coding (HEVC) standard, these techniques may similarly apply to other standards, such as the Advanced Video Coding (AVC) standard, and so on.

This brief introduction is provided for the reader's convenience and is not intended to limit the scope of the claims, nor the following sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Architecture

FIG. 1 illustrates an example architecture 100 to code a non-transform block according to a particular scanning order. Here, the coding techniques are described in the context of a video content source 102 that encodes (e.g., compresses) video content and sends the encoded video content to a device 104. For example, the video content source 102 may encode video content by selectively changing a scanning order utilized to scan blocks. The encoded video may be sent to the device 104 over a network(s) 106, where the video content is decoded by selectively changing a scanning order. Although video encoding and decoding techniques are discussed herein as being performed on separate devices (e.g., the video content source 102 and the device 104), the encoding and/or decoding may be performed on the same device or distributed across devices in a distributed computing environment.

The video content source 102 and/or the device 104 may be implemented as any type of computing device, such as a server, a laptop computer, a desktop computer, a smart phone, an electronic reader device, a mobile handset, a personal digital assistant (PDA), a portable navigation device, a portable gaming device, a game console, a tablet computer, a smart watch, a portable media player, a set top box, and the like. In one example, the video content source 102 and/or the device 104 is configured in a cluster, data center, cloud computing environment, or a combination thereof. To illustrate, the video content source 102 may operate as a cloud computing device that provides cloud services, such as storage, processing, and so on. A cloud environment may comprise a network-distributed environment that includes one or more types of computing resources (e.g., computing, networking, and/or storage devices).

The video content source 102 may be equipped with one or more network interfaces 108, one or more processors 110, and memory 112. The one or more processors 110 may include a central processing unit (CPU), a graphics processing unit (GPU), a microprocessor, a digital signal processor, and so on. The memory 112 may be configured to store one or more software and/or firmware modules, which are executable on the one or more processors 110 to implement various functions. The term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions.

As illustrated in FIG. 1, the memory 112 may include an encoder 114 (e.g., encoder module) configured to encode (e.g., compress) video content 116. The encoder 114 may apply various encoding techniques, such as prediction, transform, quantization, and/or entropy coding to generate a bitstream that represents video content. While performing the encoding techniques (e.g., before or during entropy coding), a scanning process may be performed according to a scanning order in an attempt to arrange data that represents a block of pixels in a particular order. The encoder 114 may change the scanning order for non-transform blocks that satisfy one or more criteria, such as being associated with a particular type of prediction (e.g., intra-prediction) and/or having a particular size (e.g., a size that is smaller than 8×8 block, 16×16 block, 32×32 block etc.). For example, in order to scan a particular non-transform block, the encoder 114 may change a scanning order from a first scanning order 118 that is associated with transform blocks to a second scanning order 120. Further details of the encoder 114 are discussed below in reference to FIG. 2. Although not illustrated in FIG. 1, the memory 112 may also include a decoder configured to decode video content.

The device 104 is equipped with one or more network interfaces 122, one or more processors 124, and memory 126. The one or more processors 124 may include a central processing unit (CPU), a graphics processing unit (GPU), a microprocessor, a digital signal processor, and so on. The memory 126 may be configured to store one or more software and/or firmware modules, which are executable on the one or more processors 124 to implement various functions. For example, the memory 126 may include a decoder 128 (e.g., decoder module) configured to decode video content 130 that is received from the video content source 102 and/or a different source. The decoder 128 may generally decode a bitstream representing video content by performing operations that are substantially the inverse of the encoding operations. While decoding video content, the decoder 128 may change a scanning order for non-transform blocks that satisfy one or more criteria, such as being associated with a particular type of prediction (e.g., intra-prediction) and/or having a particular size (e.g., a size that is smaller than 8×8 block). Although not illustrated in FIG. 1, the memory 126 may also include an encoder configured to encode video content.

The encoder 114 and/or decoder 128 may generally perform coding techniques on a coding unit (CU) (also referred to as a coding block (CB)), macroblock, or other type of coding structure. For ease of discussion, the coding techniques may be discussed in the context of coding units. Each coding unit may correspond to a block of pixels of an image. A coding unit may have a predetermined pixel dimension (e.g., 4×4, 8×8, 16×16, 32×32, 64×64, etc.) and/or may be defined by a video compression standard, such as H.264/Advanced Video Coding (AVC) or High Efficiency Video Coding (HEVC). In some instances, a coding unit is represented as one or more prediction units or one or more transform units as the coding unit is coded. That is, when prediction is performed, the coding unit may be represented by one or more prediction units (PUs) (also referred to as prediction blocks). Meanwhile, when a transform is performed, the coding unit may be represented by one or more transform units (TUs) (also referred to as transform blocks). A prediction unit and/or transform unit may be a sub-unit of a coding unit. As such, in some instances a coding unit may be split into sub-units and coding operations may be performed on the sub-units individually (e.g., a scanning process may be performed on a transform unit that is a sub-unit of a coding unit).

Although the encoder 114 and decoder 128 are illustrated in FIG. 1 as being implemented as modules, the encoder 114 and/or decoder 128, or any associated operation, may be implemented as one or more hardware logic components, such as Field-Programmable Gate Arrays (FPGAs), Application-Specific Integrated Circuits (ASICs), Program-Specific Standard Products (ASSPs), System-on-a-chip systems (SOCs), Complex Programmable Logic Devices (CPLDs), etc. In some instances, the encoder 114 and/or decoder 128 may be integrated with an audio encoder/decoder and include appropriate MUX-DEMUX units, or other hardware and/or software, to handle encoding/decoding of both audio and video in a common data stream or separate data streams. Alternatively, or additionally, the encoder 114 and/or decoder 128 may be incorporated as part of the one or more processors 110 (e.g., a CPU, GPU, microprocessor, etc.). In addition, in some instances the encoder 114 and/or decoder 128 may be incorporated into an operating system or other application. The encoder 114 and/or decoder 128 may operate according to a video compression standard, such as MPEG-1, MPEG-2, MPEG-4, H.261, H.263, H.264/AVC, HEVC, and so on.

Although the memory 112 and 126 are depicted in FIG. 1 as single units, the memory 112 and/or 126 (and all other memory described herein) may include one or a combination of computer-readable media. Computer-readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

As noted above, the video content source 102 and the device 104 may communicate via the network(s) 106. The network(s) 106 may include any one or combination of multiple different types of networks, such as cellular networks, wireless networks, Local Area Networks (LANs), Wide Area Networks (WANs), and the Internet.

Example Coding Components

Figure 2:
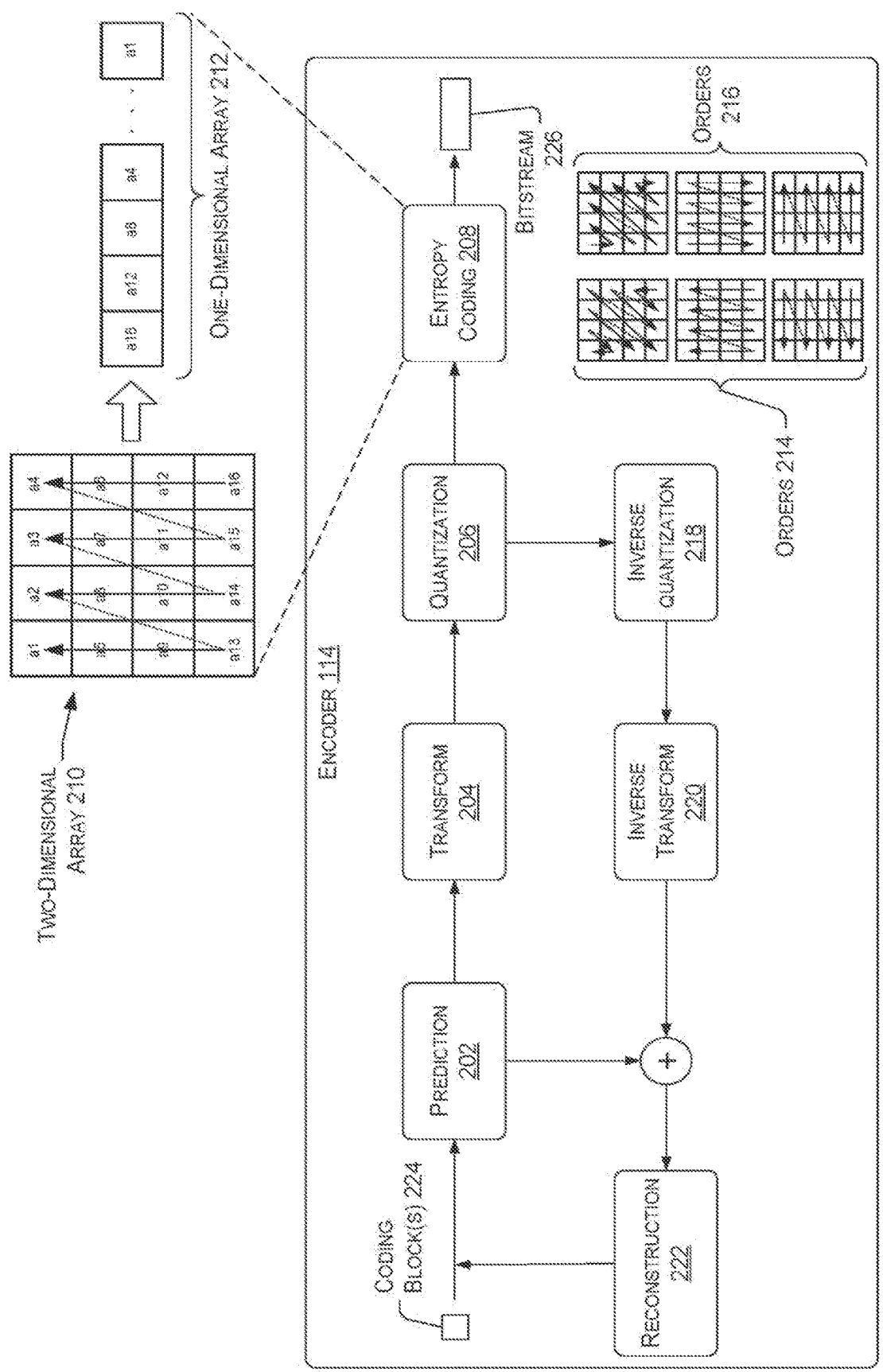
FIG. 2 illustrates example details of an encoder of FIG. 1.

FIG. 2 illustrates example details of the encoder 114 of FIG. 1. As noted above, as a coding block (e.g., unit) is coded by the encoder 114. The coding block may be represented as one or more prediction blocks at prediction and one or more transform blocks at transformation. As such, the prediction operations may be performed on individual prediction blocks, while the transform operations may be performed on individual transform blocks. For ease of illustration, the coding techniques discussed in reference to FIG. 2, and at other places in the disclosure, will generally refer to a "block." This block will comprise a prediction block at the prediction stage, and a transform block at the transformation stage.

The encoder 114 may include a prediction component 202 (e.g., module, hardware, etc.) to perform prediction on a block (e.g., a prediction block). The prediction component 202 may perform different modes of prediction on the block, such as intra-frame (e.g., spatial) or inter-frame (e.g., temporal) prediction. In intra-frame prediction, the prediction component 202 may determine a reference block in a same frame as the block that best matches the block. That is, the reference block may have the most similarity to the block (e.g., according to pixel values) from among blocks of pixels of the frame. In inter-frame prediction, the prediction component 202 may determine a reference block in a temporally neighboring frame to the frame of the block that best matches the block. Here, the reference block may have the most similarity to the block (e.g., according to pixel values) from among blocks of pixels in the neighboring frame. In either case, when the reference block does not exactly match the block, the prediction component 202 may determine a difference between pixel values of the reference block and the block. This difference is referred to as "residual information" (also known as "residue" or "residual values"). The prediction component 202 may output a two-dimensional array of residual information (e.g., a block that includes residual information for each pixel value of the prediction block).

The encoder 114 may also include a transform component 204 that may apply a transform to a block (e.g., residual information of a prediction block). The transform may comprise a discrete cosine transform (DCT), discrete wavelet transform, integer transform, or any other generally known technique to transform information. The transform may be selectively applied by the transform component 204. That is, in some instances a transform is applied (e.g., transform coefficients are output), while in other instances the transform is not applied (e.g., residual information is output without being transformed). To illustrate, the transform component 204 may refrain from performing a transform when a difference between the highest pixel values and the lowest pixel values of a block is above a predetermined value or when a rate-distortion constraint is satisfied (e.g., the rate-distortion cost of not transforming the block is smaller than that of transforming the block), and so on. In some implementations, a transform is selectively applied according to techniques discussed in U.S. patent application Ser. No. 13/593,214, filed Aug. 23, 2012 and entitled "Non-Transform Coding," which is incorporated herein by reference.

When a transform is performed, the transform component 204 may output a set of transform coefficients that correspond to residual information of a block. Alternatively, when a transform is not performed, the transform component 204 may output the residual information that was input to the transform component 204. As used herein, a "non-transform block" may refer to a block that has not been transformed, even though the block may have passed through the transform component 204. In either case, the transform component 204 may output a two-dimensional array of data (e.g., transform coefficients or residual information).

The encoder 114 may also include a quantization component 206 to quantize a block (e.g., residual information of a non-transform block or transform coefficients of a transformed block). In instances where the block was transformed, the coefficients of the block may be quantized. In instances where the block was not transformed, the residual information of the block may be quantized. The quantization component 206 may output a two-dimensional array of data (e.g., quantized residual information or quantized coefficients).

The encoder 114 may also include an entropy coding component 208 to entropy code a block (e.g., quantized residual information or quantized coefficients). To entropy code a block, a scanning process may be performed on the block to generate a one-dimensional array of data. For example, the scanning process may scan a two-dimensional array of data that represents the block (e.g., quantized residual information or quantized coefficients) to generate a one-dimensional array of the data. That is, the scanning process may serialize the data of the two-dimensional array.

FIG. 2 illustrates an example scanning process that may be performed by the entropy coding component 208. Here, sub-units of a two-dimensional array 210 (e.g., "a1"-"a16") may represent quantized residual information or quantized transform coefficients, depending on whether or not a transform was performed. As illustrated, the scanning process may begin at sub-unit "a16" and proceed along the solid line to sub-unit "a4," then scan the next column beginning at sub-unit "a15," and continue in a similar manner to scan the remaining columns. By performing the scan, the entropy coding component 208 may produce a one-dimensional array 212 of the data.

The entropy coding component 208 may perform the scanning process according to a scanning order in an attempt to group particular types of data together. In some instances, there may be a higher probability that non-zero data (e.g., non-zero coefficients or residual information) is arranged in a two-dimensional array at a particular region. For example, in returning to the two-dimensional array 210 of FIG. 2, non-zero coefficients (sometimes referred to as energies) may be grouped in an upper-left hand corner of the array 210 (e.g., toward the sub-unit "a1"). To efficiently perform entropy coding, the sub-units of the two-dimensional array 210 may be scanned according to a diagonal scan (discussed in detail in reference to FIG. 4) so that the two-dimensional array 210 is arranged into the one-dimensional array 212 with the non-zero coefficients grouped at one end. However, a uniform scanning order that is applied to all types of blocks may not lead to such grouping.

Accordingly, the entropy coding component 208 may selectively change the scanning order for different types of blocks. That is, the entropy coding component 208 may determine whether or not to change from one or more predetermined or default scanning orders. For example, for transformed blocks, one or more predetermined or default scanning orders may be used to scan the blocks (e.g., based on a prediction mode of the blocks, a size of the blocks, etc.). Meanwhile, for non-transform blocks, the entropy coding component 208 may selectively change from the one or more predetermined or default scanning orders that are used for the transformed blocks based on characteristics of the non-transform blocks.

To illustrate, when scanning a transformed block of a particular prediction mode and size, a first scanning order may be used. Meanwhile, when scanning a non-transform block of a same prediction mode and/or size as the transformed block, the entropy coding component 208 may determine whether to utilize the first scanning order or a second scanning order. If, for example, the non-transform block is associated with a particular type of prediction (e.g., the non-transform block has been subjected to intra-prediction), the second scanning order may be used. Alternatively, if the non-transform block is not associated with the particular type of prediction (e.g., the non-transform block has been subjected to inter-prediction), the first scanning order may be used. In another example, if the non-transform block has a size that is smaller than a predetermined size (e.g., the non-transform block is a 4×4 or an 8×8), the second scanning order may be used. While, if the non-transform block has a size that is equal to or larger than the predetermined size (e.g., the non-transform block is a 8×8 or larger), the first scanning order may be used.

In yet another example, the entropy coding component 208 may determine whether or not to change from a predetermined or default scanning order associated with transformed blocks based on a weighted value of a prediction mode of the non-transform block and a weight value of the size of the non-transform block. For instance, if a size of a two-dimensional array is larger than a predetermined size by a particular amount, then the size may be weighted more heavily towards maintaining a current scanning order. Alternatively, or additionally, the size or the prediction mode may be selected to be weighted more heavily than the other (e.g., prediction mode would have a larger impact a decision than size of a block).

In the example of FIG. 2, the entropy coding component 208 may determine whether or not to switch from one of predetermined or default scanning orders 214 to one of the scanning orders 216. Here, the predetermined scanning orders 214 may generally be performed, except in instances where a block includes particular characteristics as discussed above (e.g., a non-transform block having a particular size and/or associated with a particular prediction mode). Meanwhile, the scanning orders 216 may correspond to inverse scanning orders of the predetermined scanning orders 214. As such, in some examples the entropy coding component 208 may determine whether or not to switch from a predetermined scanning order to an inverse of the predetermined scanning order. Although in other examples the scanning orders 216 may comprise other types of scanning orders besides inverse scanning orders.

In some implementations, by selectively changing the scanning order from one or more predetermined or default scanning orders, the techniques may allow particular types of data associated with the block to be efficiently arranged and/or avoid unnecessarily introducing complexity due to changing a scanning order. For instance, because non-transform blocks associated with intra-prediction may generally include non-zero values (e.g., residual information) in an opposite region in comparison to a transformed block (e.g., at a lower-right hand side in comparison to an upper-right hand side), the techniques may efficiently arrange the non-zero values at one end of a one-dimensional array for efficient entropy coding by changing a scanning order for non-transform blocks that are associated with intra-prediction. In addition, because a change in a scanning order may increase the complexity of scanning a block (e.g., in comparison to maintaining the scanning order), the techniques may avoid introducing added complexity to the scanning, when the change may not produce any added benefit, by changing the scanning order for non-transform blocks that are smaller than a predetermined size.

Although scanning processes are described as being performed by the entropy coding component 208, other components may perform the scanning processes, such as the quantization component 206 or another component. In at least one example, the quantization component 206 performs a scanning process and outputs a one-dimensional array of data that is input to the entropy coding component 208.

The entropy coding component 208 may perform entropy coding on a one-dimensional array of data that results from a scanning process. The entropy coding may include performing context adaptive binary arithmetic coding (CABAC), context adaptive variable-length coding (CAVLC), probability entropy coding (PIPE), and so on. The entropy coding may generate a bitstream that at least partly represents video content. As illustrated in FIG. 2, the input of one or more coding blocks 224 into the encoder 114 may result in the output of a bitstream 226.

The encoder 114 may also include an inverse quantization component 218 to perform an inverse quantization of a block that is currently be encoded. Thereafter, an inverse transform component 220 may selectively apply an inverse transform to the block. If the block was transformed at the transform component 204, then an inverse transform may be performed on the block. However, if the block was not transformed at the transform component 204, then the inverse transform may not be performed. In either case, the block may be reconstructed by a reconstruction component 222 based on information from the prediction component 202. This information may indicate a reference block utilized to form residual information for the block. The reconstructed block may be used to encode another block, such as another block in a same or different frame as the block.

Although not illustrated in FIG. 2, the encoder 114 may include other types of components, such as a de-blocking filter to smooth edges between boundaries of blocks or any other component.

Figure 3:
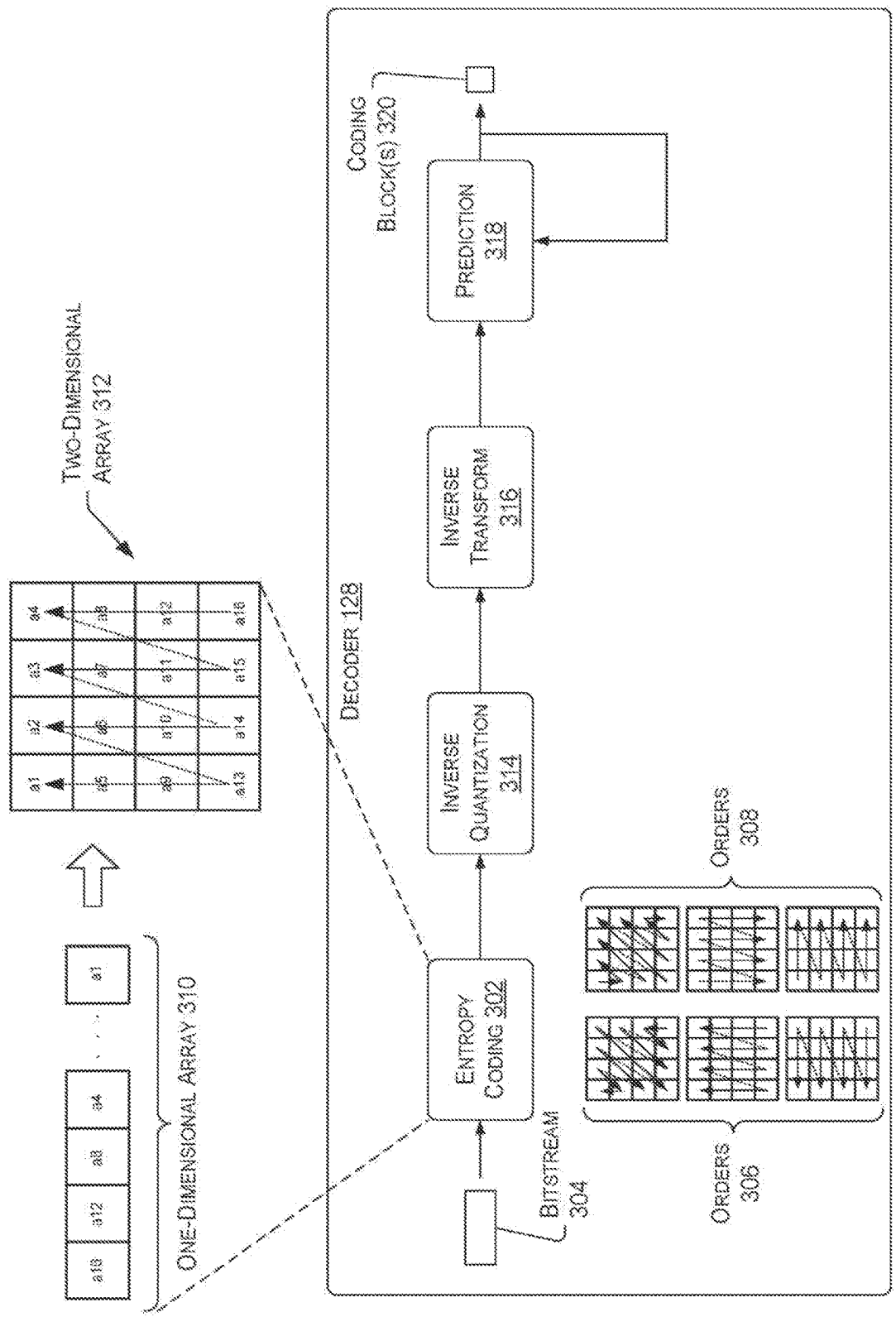
FIG. 3 illustrates example details of a decoder of FIG. 1.

FIG. 3 illustrates example details of the decoder 128 of FIG. 1. The decoder 128 may generally perform inverse operations of the encoder 114. The decoder 128 may include an entropy coding component 302 to perform inverse entropy coding on a bitstream 304. The entropy coding may include scanning data of the bitstream 304 according to a particular scanning order (e.g., a scanning order that was used by the entropy coding component 208). The scanning order may be specified in the bitstream 304 or elsewhere, determined based on characteristics of a block (e.g., a size of the block, a prediction mode, a transform mode, etc.), previously defined, and so on. For example, a scanning process may select a scanning order from among predetermined or default scanning orders 306 and inverse scanning orders 308 to perform inverse entropy coding on the bitstream 304. In one example, as shown in FIG. 3, the scanning process may scan a one-dimensional array 310 (e.g., the bitstream 304) into a two-dimensional array 312 according to a particular scanning order. If the scanning process starts at a left-hand side of the one-dimensional array 310 (e.g., sub-unit "a16"), sub-units "a16," "a12," "a8," and "a4," may be scanned into the two-dimensional array 312 as a column of the two-dimensional array 312. Then, the next set of sub-units of the one-dimensional array 310 (e.g., "a15," "a11," "a7," and "a3") may be scanned into another column of the two-dimensional array 312, and so on. Alternatively, in some instances, if the scanning process starts at the right-hand side of the one-dimensional array 310, an inverse scan may be performed (e.g., inverse to the scan that was performed to encode the data). As similarly discussed above in reference to the entropy coding component 208 of FIG. 2, the entropy coding component 302 may selectively change a scanning order that is used to scan the bitstream 304. For example, if a different scanning order was used to encode a block (e.g., different than a predetermined or default scanning order used for another block), the entropy coding component 302 may switch to the different scanning order for that block. As noted above, a different scanning order may be used when, for example, a non-transform block is associated with a particular type of prediction (e.g., intra-prediction) and/or has a size that is smaller than a predetermined size. The entropy coding component 302 may include similar features as those discussed above in reference to the entropy coding component 208 of FIG. 2.

The decoder 128 may also include an inverse quantization component 314, an inverse transform component 316, and a prediction component 318. Components 314-318 may generally include features similar to those of the components 202-206 of FIG. 2, to perform inverse operations of the components 202-206. For example, the inverse quantization component 314 may perform inverse quantization on a block (e.g., quantized coefficients or quantized residual information), the inverse transform component 316 may perform an inverse transform on a block (e.g., transform coefficients), and the prediction component 318 may perform prediction on a block (e.g., residual information). In instances where a block was not transformed, the inverse transform component 316 may refrain from applying an inverse transform. By doing so, the decoder 128 may output one or more coding blocks 320 that represent decoded video content.

Although in the discussion above of the example decoder 128 the scanning process is performed by the entropy coding component 302, the scanning process may be performed by another component, such as the inverse quantization component 314 or any other component. In one example, the inverse quantization component 314 may inverse quantize data before or after the data is changed from a one-dimensional array to a two-dimensional array.

Example Scanning Orders

Figure 4A:
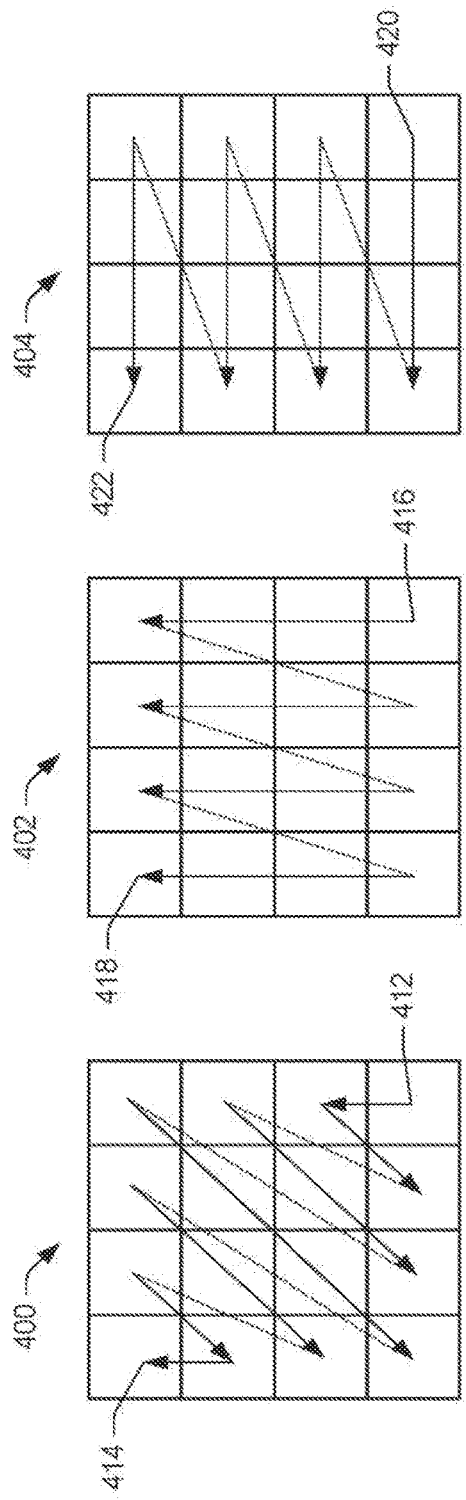
FIGS. 4A-4B illustrate example scanning orders that may be utilized to scan a block.
Figure 4B:
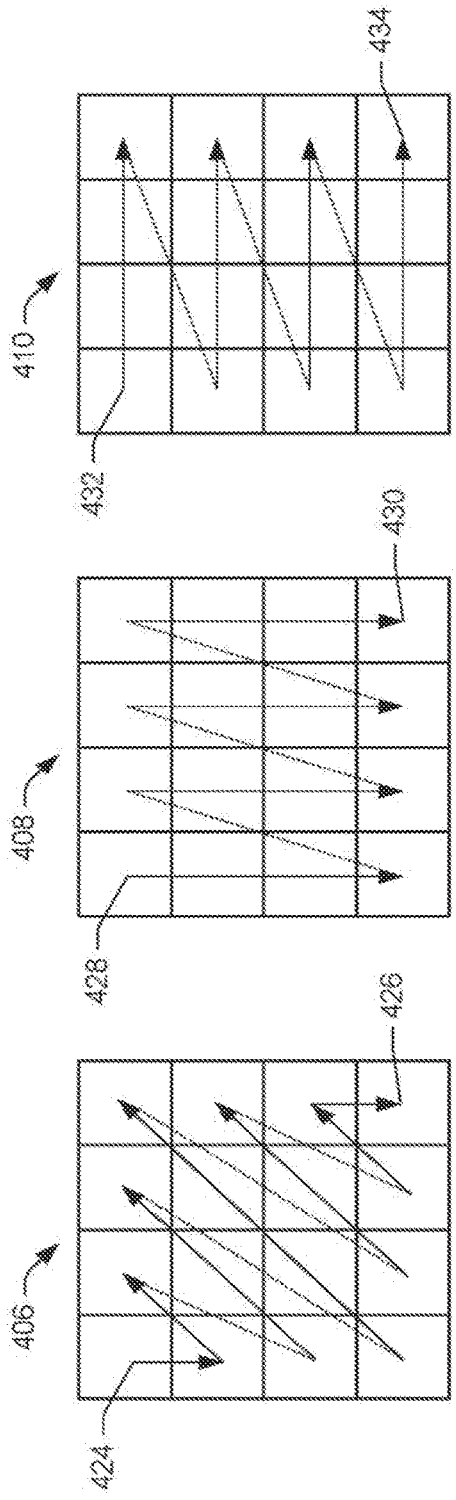

FIGS. 4A and 4B illustrate example scanning orders 400-410 that may be utilized to scan a block. The scanning orders 406-410 may comprise inverse scanning orders of the scanning orders 400-404, respectively. In some instances, the scanning orders 400-404 may comprise default scanning orders that are generally applied, whereas the scanning orders 406-410 may comprise alternative scanning orders that may be applied to non-transform blocks that include particular characteristics, such as a particular size and/or prediction mode. If multiple default scanning orders are used in an implementation, a default scanning order may be selected for a block based on a size of the block, prediction mode that was used on the block, a type of the block (e.g., luminance or chrominance), and so on. In FIGS. 4A and 4B, the scanning orders 400-410 may generally scan along solid lines and reposition for a next scan along dotted lines.

Although the scanning orders 400-410 are illustrated in FIGS. 4A and 4B, other types of scanning orders may be used for a scanning process. Further, although the scanning orders 400-404 are described as default scanning orders, other scanning orders may be default scanning orders, such as the scanning orders 406-410, any one of the scanning orders 400-410, or any combination of the scanning orders 400-410.

The scanning order 400 may comprise a diagonal scan that starts at a sub-unit 412 of a block and scans the block along solid lines to reach a sub-unit 414. The scanning order 402 may comprise a vertical scan that starts at a sub-unit 416 of a block and scans the block along solid lines to reach a sub-unit 418. The scanning order 404 may comprise a horizontal scan that starts at a sub-unit 420 of a block and scans the block along solid lines to reach a sub-unit 422.

Meanwhile, the scanning orders 406-410 comprise inverse scanning orders of the scanning orders 400-404, respectively. In particular, the scanning order 406 comprises an inverse diagonal scan that starts at a sub-unit 424 and ends at a sub-unit 426, the scanning order 408 comprises an inverse vertical scan that starts at a sub-unit 428 and ends at a sub-unit 430, and the scanning order 410 may comprise an inverse horizontal scan that starts at a sub-unit 432 and ends at a sub-unit 434.

In some implementations, if it is determined to utilize a different scanning order than a default scanning order, an inverse scanning order of the default order may be utilized. To illustrate, if while coding according to the scanning order 402 (e.g., the vertical scan) it is determined to use an alternative scanning order for a block, the scanning order 408 (e.g., the inverse vertical scan) may be used. The alternative scanning order may be used for non-transform blocks that include particular characteristics, such as non-transform blocks that are associated with intra-prediction and/or have a size that is smaller than a predetermined size.

Example Process

Figure 5:
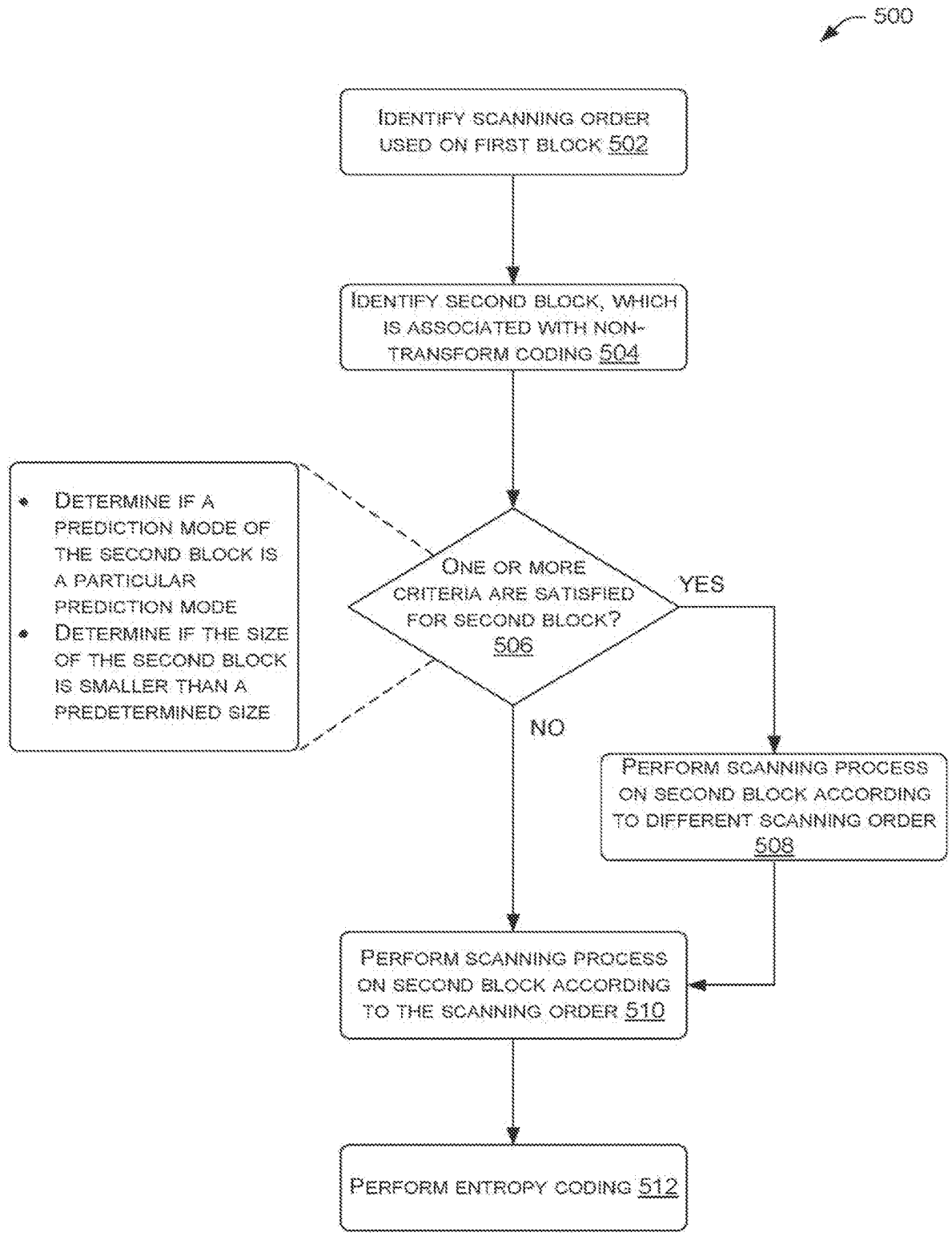
FIG. 5 illustrates an example process to code non-transform blocks of video content by selectively changing a scanning order.

FIG. 5 illustrates an example process 500 for employing the techniques described herein. For ease of illustration process 500 is described as being performed by a coding component. For example, one or more of the individual operations of the process 500 may be performed by the encoder 114 and/or the decoder 128 of the architecture 100 of FIG. 1. However, the process 500 may be performed in other architectures. Moreover, the architecture 100 may be used to perform other processes.

The process 500 (as well as each process described herein) is illustrated as a logical flow graph, each operation of which represents a sequence of operations that can be implemented in hardware, software, or a combination thereof. In the context of software, the operations represent computer-executable instructions stored on one or more computer readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any of the operations may be omitted.

At 502, a coding component (e.g., encoder or decoder) may identify a scanning order used for scanning a first block, which is associated with a transform coding mode. The first block may be referred to as a transformed block, indicating that the first block has been transformed. The scanning order of the first block may comprise a default scanning order for blocks that are associated with a prediction mode of the first block, a size of the first block, and so on.

At 504, the coding component may identify a second block, which is associated with a non-transform coding mode. The second block may be referred to as a non-transform block, indicating that the second block has not been transformed (e.g., is associated with non-transform coding). The second block may have at least one characteristic that is the same as a characteristic of the first block, such as a same size, prediction mode, block type (e.g., whether the block is a luminance block (component representing brightness in black and white) or chrominance block (component representing color)), and so on. Further, the second block and the first block may be part of a same image (e.g., frame).

At 506, the coding component may determine whether or not one or more criteria are satisfied for the second block. For example, the coding component may determine if a prediction mode of the second block is a particular prediction mode, such as intra-prediction. Here, the coding component may identify the prediction mode that was applied for the second block (e.g., intra-prediction or inter-prediction). Alternatively, or addition, the coding component may determine if a size of the second block is smaller than a predetermined size.

When the one or more criteria are satisfied at 506 (e.g., the YES route), the coding component may perform a scanning process at 508 on the second block according to a different scanning order than that which was used for the first block. For example, the scanning process may utilize an inverse of the scanning order that was used on the first block. In one example, the coding component may utilize a different scanning order than a default scanning order in which the second block would have otherwise been scanned. Alternatively, when the one or more criteria are not satisfied at 506 (e.g., the NO route), the coding component may perform a scanning process at 510 on the second block according to the scanning order that was used for the first block. As such, the determination at 506 may determine whether to scan the second block according to the scanning order of the first block or to scan the second block according to a different scanning order.

In either case of performing a scanning process at 508 or 510, the process may include scanning a two-dimensional array of residual information of the second block to generate a one-dimensional array of residual information. That is, the scanning process may serialize the data of the second block.

At 512, the coding component may perform entropy coding on the second block. This may include entropy coding a one-dimensional array of residual information (e.g., quantized residual information) that represents the second block. If the scanning process at 508 was performed, then the one-dimensional array may include sub-units of the second block (e.g., pieces of residual information) that are order according to a different order than that used for entropy coding the first block (e.g., transformed blocks).

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain embodiments include, while other embodiments do not include, certain features, elements and/or steps. Thus, such conditional language is not generally intended to imply that certain features, elements and/or steps are in any way required for one or more embodiments or that one or more embodiments necessarily include logic for deciding, with or without user input or prompting, whether certain features, elements and/or steps are included or are to be performed in any particular embodiment.

Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagram described herein and/or depicted in the attached figures should be understood as potentially representing modules, segments, or portions of code that include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. One or more computer-readable storage media storing a bitstream organized to facilitate decoding operations by a video decoder, the operations comprising, for one or more coding units ("CUs") in a current image:
    determining prediction values for one or more prediction blocks associated with the one or more CUs in the current image by intra-frame prediction using one or more reference blocks within the current image;
    decoding residual values for a first transform block and second transform block in the current image, including:
        identifying the first transform block, the first transform block being associated with a transform coding mode and having an associated block size, the first transform block being associated with the one or more CUs in the current image;
        based at least in part on comparison of the block size of the first transform block to a predetermined size and based at least in part on the first transform block being associated with the transform coding mode, determining to scan the first transform block according to a particular scanning order;
        scanning the first transform block according to the particular scanning order;
        identifying the second transform block, the second transform block being associated with a non-transform coding mode and having an associated block size that is the same as the block size of the first transform block, the second transform block also being associated with the one or more CUs in the current image;
        based at least in part on comparison of the block size of the second transform block to the predetermined size and based at least in part on the second transform block being associated with the non-transform coding mode, determining to scan the second transform block according to an inverse scanning order that is inverse to the particular scanning order for scanning the first transform block;
        scanning the second transform block according to the inverse scanning order; and
    combining the prediction values with the residual values.

2. The one or more computer-readable storage media of claim 1, wherein the particular scanning order comprises a default scanning order for transform blocks.

3. The one or more computer-readable storage media of claim 1, wherein, when the particular scanning order is a horizontal scanning order, the inverse scanning order is an inverse horizontal scanning order.

4. The one or more computer-readable storage media of claim 1, wherein, when the particular scanning order is a vertical scanning order, the inverse scanning order is an inverse vertical scanning order.

5. The one or more computer-readable storage media of claim 1, wherein, when the particular scanning order is a diagonal scanning order, the inverse scanning order is an inverse diagonal scanning order.

6. The one or more computer-readable storage media of claim 1, the operations further comprising:
    identifying a third transform block having an associated block size that is different than the block size of the first transform block;
    based at least in part on comparison of the block size of the third transform block to the predetermined size, determining to scan the third transform block according to the particular scanning order; and
    scanning the third transform block according to the particular scanning order.

7. The one or more computer-readable storage media of claim 1, wherein when the predetermined size is 4×4.

8. The one or more computer-readable storage media of claim 1, wherein the first transform block and the second transform block are part of a same CU.

9. The one or more computer-readable storage media of claim 1, wherein the first transform block and the second transform block are coded according to the High Efficiency Video Coding (HEVC) standard.

10. The one or more computer-readable storage media of claim 1, wherein the first transform block and the second transform block are luma blocks, the first transform block, but not the second transform block, including transform coefficients for residual values.

11. The one or more computer-readable storage media of claim 1, wherein scanning the second transform block according to the inverse scanning order comprises:
    scanning an array of residual information of the second transform block according to the inverse scanning order.

12. A method implemented by a computing device, the method comprising, for one or more coding units ("CUs") in a current image:
    determining prediction values for one or more prediction blocks associated with the one or more CUs in the current image by intra-frame prediction using one or more reference blocks within the current image;
    decoding residual values of a first transform block and second transform block in the current image, including:
        identifying the first transform block, the first transform block being associated with a transform coding mode, wherein the first transform block has a block size of 4×4, the first transform block being associated with the one or more CUs in the current image;

based at least in part on comparison of the block size of the first transform block to a predetermined size and based at least in part on determining that the first transform block is associated with the transform coding mode, scanning the first transform block according to a particular scanning order for scanning the first transform block;

identifying the second transform block, the second transform block being associated with a non-transform coding mode, wherein the second transform block has a block size of 4×4, the second transform block also being associated with the one or more CUs in the current image; and based at least in part on comparison of the block size of the second transform block to the predetermined size and based at least in part on determining that the second transform block is associated with the non-transform coding mode, scanning the second transform block according to an inverse scanning order, wherein the inverse scanning order is inverse to the particular scanning order; and combining the prediction values and the residual values.

13. The method of claim 12, wherein the first transform block and the second transform block are luma blocks, the first transform block, but not the second transform block, including transform coefficients for residual values.

14. The method of claim 12, wherein the first transform block and the second transform block are part of a same CU.

15. The method of claim 12, wherein, when the particular scanning order is a horizontal scanning order, the inverse scanning order is an inverse horizontal scanning order.

16. The method of claim 12, wherein, when the particular scanning order is a vertical scanning order, the inverse scanning order is an inverse vertical scanning order.

17. The method of claim 12, wherein, when the particular scanning order is a diagonal scanning order, the inverse scanning order is an inverse diagonal scanning order.

18. A system comprising:
one or more processors; and
a decoder implemented at least in part by the one or more processors and configured to perform decoding operations to decode a bitstream, the operations comprising, for one or more coding units ("CUs") in a current image:

determining prediction values for one or more prediction blocks associated with the one or more CUs in the current image by intra-frame prediction using one or more reference blocks within the current image;

decoding residual values of a first transform block and second transform block in the current image, including:

identifying the first transform block, the first transform block being associated with a transform coding mode, wherein the first transform block has a block size of 4×4, the first transform block being associated with the one or more CUs in the current image;

based at least in part on comparison of the block size of the first transform block to a predetermined size and based at least in part on determining that the first transform block is associated with the transform coding mode, scanning the first transform block according to a particular scanning order for scanning the first transform block;

identifying the second transform block, the second transform block being associated with a non-transform coding mode, wherein the second transform block has a block size of 4×4, the second transform block also being associated with the one or more CUs in the current image; and based at least in part on comparison of the block size of the second transform block to the predetermined size and based at least in part on determining that the second transform block is associated with the non-transform coding mode, scanning the second transform block according to an inverse scanning order, wherein the inverse scanning order is inverse to the particular scanning order; and combining the prediction values and the residual values.

19. The system of claim 18, wherein the first transform block and the second transform block are luma blocks, the first transform block, but not the second transform block, including transform coefficients for residual values.

20. The system of claim 18, wherein the first transform block and the second transform block are part of a same CU.

* * * * *